US006891851B1

(12) United States Patent
Demakakos (10) Patent No.: US 6,891,851 B1
(45) Date of Patent: May 10, 2005

(54) METHOD AND APPARATUS FOR COMMUNICATING MAINTENANCE MESSAGES AND/OR TEST MESSAGES OF DIGITAL SUBSCRIBER LINE SERVICES

(75) Inventor: William N. Demakakos, Brooklyn, NY (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/227,575

(22) Filed: Jan. 8, 1999

(51) Int. Cl.[7] .................................................. H04J 3/16
(52) U.S. Cl. ...................... 370/467; 370/249; 379/9.06; 379/22.01; 379/22.04
(58) Field of Search ................................ 370/241–247, 370/248–251, 464–467, 359, 384, 523, 524, 513, 386; 379/104, 8, 9.06, 14.01, 10.01, 22.01, 22.03, 22.04, 29.01, 415; 375/224, 213

(56) References Cited

U.S. PATENT DOCUMENTS

| | | | | |
|---|---|---|---|---|
| 4,998,240 A | | 3/1991 | Williams | |
| 5,151,896 A | * | 9/1992 | Bowman et al. | 370/401 |
| 5,189,663 A | | 2/1993 | Williams | |
| 5,369,691 A | * | 11/1994 | Cain et al. | 379/415 |
| 5,373,501 A | | 12/1994 | Roland | |
| 5,375,159 A | | 12/1994 | Williams | |
| 5,442,630 A | | 8/1995 | Gagliardi et al. | |
| 5,784,558 A | * | 7/1998 | Emerson et al. | 370/249 |
| 5,835,566 A | * | 11/1998 | Cowgill | 370/241 |
| 6,002,689 A | * | 12/1999 | Christie et al. | 370/467 |
| 6,018,529 A | * | 1/2000 | Toth | 370/463 |
| 6,035,028 A | * | 3/2000 | Ward et al. | 379/201.02 |
| 6,081,591 A | * | 6/2000 | Skoog | 370/467 |
| 6,311,072 B1 | * | 10/2001 | Barclay et al. | 455/552 |
| 6,324,179 B1 | * | 11/2001 | Doshi et al. | 370/395 |

OTHER PUBLICATIONS

"D4 Carrier System Cisco 90i–IDSN Digital Subscriber Line (IDSL) Channel Unit", web page, issue 2, Jun. 1998, Copyright 1998, Cisco Systems Inc., printed Dec. 3, 2001, http://www.cisco.com/univercd/cc/td/doc/product/access/c90/c90iprac.htm.*

"Cisco 90 Series", web page, printed Jul. 10, 1998, 6 pages, http://www–fr.cisco.com/univercd/cc/td/doc/prod_cat/p90.htm.

"D4/SLC–96 ISDN Basic Rate Interface Channel Unit", TELTREND Technical Publication 57–019601, Section 72–BR14801–00, Dec. 1996, 18 pages.

"NYNEX High Bit Rate Digital Subscriber Line (HDSL) Request for Revised Proposal RRP #97–7005GG–Revised", Feb. 21, 1997, 34 pages.

* cited by examiner

Primary Examiner—Hassan Kizou
Assistant Examiner—David Odland
(74) Attorney, Agent, or Firm—Leonard C. Suchyta, Esq.; Joel Wall, Esq.; Rader, Fishman & Grauer PLLC (57) ABSTRACT

A subscriber's data circuit between channel bank and the customer premises carries fractional T1 bandwidth on a digital subscriber line (DSL) circuit. For example, for an ISDN rate digital subscriber line (IDSL), the circuit between the network termination at the customer premises and a D4 channel bank carries data on two combined B-channels. Such a circuit also carries a D-channel and an embedded operations channel (EOC), in normal ISDN fashion. A data service using such a line circuit, however, only transports the data (combined B-channels) through the network. The D-channel and the EOC are not carried through the network. To facilitate testing of the subscriber's circuit, the carrier operations and testing facilities transmit loop-back commands or the like in band to the channel bank. A command may be addressed to any active node along the subscriber's DSL circuit. The line card serving the subscriber in the channel bank detects the commands, removes the commands from the in-band data and reformats the commands for transmission over the EOC channel. The line card addresses the commands and sends the EOC format commands over the DSL circuit to the appropriate node along the subscriber's line. In response, the node connects the circuit in a loop-back mode, to enable test signal transmission and analysis.

37 Claims, 3 Drawing Sheets

METHOD AND APPARATUS FOR COMMUNICATING MAINTENANCE MESSAGES AND/OR TEST MESSAGES OF DIGITAL SUBSCRIBER LINE SERVICES

TECHNICAL FIELD

The present invention relates to a technique for controlling line elements in certain types of digital subscriber line circuits, to enable line test functions, such as loop-back testing or the like.

BACKGROUND

Modern society continues to create exponentially increasing demands for digital information, and the communication of such information creates increasing needs for ever faster data communication speeds.

The most common form of computer-to-computer data communication in use today relies on modems and analog telephone connections. Such modems communicate data as modulated audio signals, within the voice bandwidth of the telephone network. The various elements of the telephone network treat these voice frequency signals exactly like voice type analog audio signals. This telephone-based operation provides the voice grade analog modem a unique power, the necessary connections are virtually ubiquitous. Such modems can communicate via virtually any telephone line or wireless telephone (e.g. cellular) to any other such telephone link, virtually anywhere in the world.

The telephone network was designed to provide approximately 3.3 kHz of analog voice bandwidth. The bandwidth provided is optimal for efficient transport of understandable voice information. Most switches in the telephone network now provide transport and switching in the digital form, typically using synchronous time slot interchange equipment. The digital capabilities, however, match the bandwidth optimized for voice telephone services. In particular, the switches provide 64 kb/s channel slots for calls, and the elements converting signals between the analog domain and the digital domain specifically limit the digital domain to the 64 kb/s rate.

As such, the voice telephone network simply was not designed for high-speed data communications. The small voice grade bandwidth places severe limitations on the speed of data communications. Analog telephone line modems commonly in use today operate at speeds of 28.8 kb/s or 33.6 kb/s, although newer modems are now available with 56 kb/s capabilities. Such speeds are adequate for many applications, such as E-mail and transfers of relatively small text files. However, many new multimedia applications severely tax the limits of such modems. At such speeds, large file transfers take many minutes. A user surfing the Internet often does not want to wait for a large image or video file to download at these snail-pace speeds.

Integrated Services Digital Network (ISDN) offers faster data communications and the capacity for concurrent data and voice telephone services. For ISDN service, a user obtains a digital subscriber line (DSL) termination unit connected to the customer premises end of a telephone line. The basic rate interface (BRI) DSL terminal unit provides duplex 160 kb/s digital communication with corresponding elements in the telephone network. The 160 kb/s capacity carries two bearer (B) channels, each at 64 kb/s, one data (D) channel at 16 kb/s and overhead information contained in a 16 kb/s embedded operations channel (EOC).

The telephone network switches the B-channels through the network, using the 64 kb/s synchronous time slots, in much the same way that it switches plain old telephone service (POTS) calls. B-channel data calls, however, may be switched through as end-to-end digital communications at the full 64 kb/s rate because now the digital channel rate matches the channel rate defined by the time slot interchange units within the telephone switch fabric. There are no conversions between analog and digital content within the network. The B-channels may be used separately, for example, for one voice telephone call and one data communications. Some applications also allow aggregation of the channels, to combine the B-channels to provide data communications up to the combined rate of 128 kb/s, when there is no concurrent telephone usage.

Most applications of ISDN carry the D-channel only between the customer premises and the serving central office. The D-channel typically is used for signaling, for call set-up and the like. The EOC channel goes to the central office switch, and the switch is in communication with various operations and support systems, to enable maintenance and testing type functions.

Standard ISDN equipment, such as the ISDN network termination unit at the customer premises, digital loop carrier (DLC) systems and ISDN span repeaters in the loop to the customer premises all send and receive certain codes in the EOC data stream. For example, each of these elements recognizes codes addressed to them to bridge the wires of the line and form a 'loop-back', effectively coupling received signals for transmission back to the central office end of the line. Subsequent addressed signals cause the element to tear down the loop-back connection. During a loop-back condition, test equipment coupled to the line can transmit signals over the line and analyze signals looped back through the line, to determine the line condition. If there are multiple elements on the line, such as repeaters and the terminal adapter, loop-back testing through the various devices may even help to identify the location of a fault.

ISDN Digital Subscriber Line (IDSL) uses the 2B1Q line coding standard for ISDN BRI circuits for data-only applications. Essentially, the two B-channels are combined and dedicated to the data service. Consequently, ISDL operates at 128 kb/s. IDSL provides this higher speed data service for line lengths up to 18,000 feet without a repeater or greater distances with ISDN repeaters, the same as standard 2B+D ISDN.

Because IDSL uses the standard ISDN line coding, customers with standard basic rate interface (BRI) type terminal adapters can use their current adapters (in a leased line mode) together with any associated equipment, for connecting to ISDL lines. At the network end of the line, the ISDL line terminates on a line card in a channel bank. However, instead of coupling the B-channels to a time slot interchange unit for switching in the same manner as ISDN, the channel bank connects the customer's B-channels over two slots on a dedicated transport to a desired data point, typically on a high-speed backbone network, such as a Frame Relay network, a super multi-mega-bit data service (SMDS) network or an asynchronous transfer mode (ATM) network. The link from the customer premises to the backbone network is a dedicated or "nailed-up" connection. The backbone network, however, provides fast access to packet-switched communication services. In this manner, IDSL lines can provide dedicated access through the particular fast packet backbone network to the Internet, private networks, or the like.

Because the two-channels provide a nailed up connection, there is no need for signaling over the D-channel, and the D-channel is not transported through the network. Also, because the connection is dedicated and does not go through a switch, there is no connection of the EOC channel on the network side. The line card and the network termination unit, the DLC terminals and/or any repeaters on the line keep the EOC channel open on the line. However, there is no network connection to enable the network to use the EOC channel. Thus in present implementations, there is no effective technique to communicate maintenance and operations messages, for example relating to loop-back testing, to the elements on the IDSL loop.

Some data communications systems utilize the in-band transmission of test commands. DDS (Digital Data Service) specifies a set of addressable command codes for transmission in the data stream over a link to customer premise data equipment. One solution of the IDSL line testing problem might be to use these or similar command codes. At least one vendor has proposed utilizing DDS codes within the data transport stream on the IDSL line, to perform certain loop-back functions. The line cards would be able to recognize these codes and perform the loop-back functions. However, this is a vendor proprietary approach, limited to the vendor's own products. The loop-back functions work only with the one vendor's equipment, i.e. that vendor's line cards. Elements not incorporating such cards, such as the network termination units or DLC systems and repeaters sold by other vendors would not recognize such codes.

To extend the in-band solution to also enable testing of repeaters, DLCs and network terminations is disadvantageous in that it would require a modification of those line components to recognize such codes. The network carrier would not be able to use standard ISDN components for the IDSL lines. Until a standard for the test codes is established, the carrier would have to limit the network connections to compatible equipment, i.e. to line components able to recognize the vendor's proprietary test codes. This would force the carrier to use only one vendor's proprietary equipment matching the vendor's channel bank and including all components from the line cards to the terminations at all of the customer premises served through that bank.

A need therefore exists for an efficient technique to communicate maintenance and testing messages to and from communication components on an IDSL line or similar line, without requiring a modification or upgrade of the components on the line or use of vendor proprietary components. The technique also should be readily adaptable to other types of digital subscriber line.

SUMMARY OF INVENTION

The present invention addresses the above stated needs by communicating the maintenance and test messages to or from a line card at the edge of the network, using in-band communication. The line card couples the messages and provides protocol conversion, between the in-band communication and the embedded operations channel (EOC) on the digital subscriber line. Repeaters, terminal adapters and the like utilize the standard EOC commands in the normal manner. This enables standard components to send and/or receive test or maintenance messages, for example for loop-back testing, without modification of the standard components.

The 'edge' of the network essentially is the interface between the upstream termination of the subscriber's line and the elements of the carrier's transport network. In the preferred embodiments, for example, the line card is an element in a channel bank or terminal of a carrier system. The line card provides the interface of the subscriber line to the common components of the carrier system, to enable communications to and from the line through the transport fabric of the network.

Thus, a first aspect of the invention relates to a method of communicating testing or maintenance related messages through a network to a component of a digital subscriber line. The method involves sending a message addressed for the component in-band through a communication channel of the network. The channel is one that has been assigned to the digital subscriber line. At the edge of the network, the in-band message is detected and converted to an addressed out-of-band message. From the edge of the network, the converted message is sent over an embedded operations channel on the digital subscriber line toward the component.

Another aspect of the invention relates to communicating testing or maintenance related messages through a network from the component of the digital subscriber line. The component sends an out-of-band message over the embedded operations channel on the digital subscriber line to an edge of the network. At the edge of the network, this method involves detecting the message and converting it to an in-band message. The converted message is sent through the network to a testing or maintenance device, over a communication channel assigned to the digital subscriber line.

A line card for implementing the invention includes a network interface for two-way digital communication of information for the digital subscriber line through a channel of the network assigned to the digital subscriber line. A line interface provides a connection for the digital subscriber line. This line connection enables two-way digital communication of information between the assigned channel and a communication channel on the line. The line interface also provides two-way digital communications over an embedded operations channel on the digital subscriber line. The embedded operations channel is logically separate from the communication channel, e.g. to provide out-of-band communications for maintenance and testing. A processor, coupled to the interfaces, converts maintenance or testing messages between an in-band protocol used on the assigned channel and a protocol used on the embedded operations channel.

The preferred embodiment relates to implementation for an IDSL type subscriber's line. The subscriber's line circuit extends between a D4 channel bank and the customer premises. For data communications, the line carries fractional T1 bandwidth corresponding to two DS0 channels (matching the two B-channel capacity of the line). For data service, a fractional T1 link couples the B-channels to a high-speed packet network, such as Frame Relay, SMDS or ATM, to enable access to the Internet or private data networks. The line circuit also transports the D-channel and the embedded operations channel (EOC), in normal ISDN fashion, but only between the channel bank and the network termination at the customer premises. For maintenance and testing purposes, the carrier operations facilities transmit loop-back commands or the like, as in-band signaling messages, for example using a DDS protocol. The commands go as in-band data together with other data intended for the subscriber, to the line card within the channel back that is serving the particular IDSL circuit. Upstream maintenance and testing communications also use in-band transport, e.g. in the DDS protocol, between the line card and the operations facilities.

A command may be addressed to any active node along the subscriber's IDSL circuit, albeit in the in-band protocol (e.g. DDS). The line card serving the subscriber's circuit detects the addressed commands, removes the commands from the in-band data and reformats the commands for transmission over the EOC channel. The line card addresses the commands using the normal protocol for EOC communications and sends the EOC format commands over the IDSL circuit to the appropriate component along the subscriber's line. Assuming that the command is a loop-back command, for example, the addressed component connects the circuit in a loop-back mode, to enable test signal transmission and analysis. The line card also provides protocol conversion between EOC and DDS and interfaces upstream messages from the EOC channel for in-band transport through the network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS the drawing figures depict the present invention by way of example, not by way of limitations. In the figures, like reference numerals refer to the same or similar elements.

DETAILED DESCRIPTION OF THE PREFERRED EMBODIMENTS

A typical digital subscriber line, particularly an ISDN Digital Subscriber Line (IDSL), includes an embedded operations channel (EOC). The present invention relies on in-band communication of maintenance and testing messages, between an operations center or test point equipment and a line card at the edge of the network that provides the digital subscriber line service. The line card converts between the in-band protocol and standard embedded operations channel (EOC) messages and communicates the messages over the out-of-band EOC channel on a digital subscriber's line. Any network component along the line, such as one or more repeaters, digital loop carrier terminal equipment and/or the network termination unit at the customer premises communicates over the EOC using the standard EOC protocol for maintenance and testing purposes.

Figure 1:
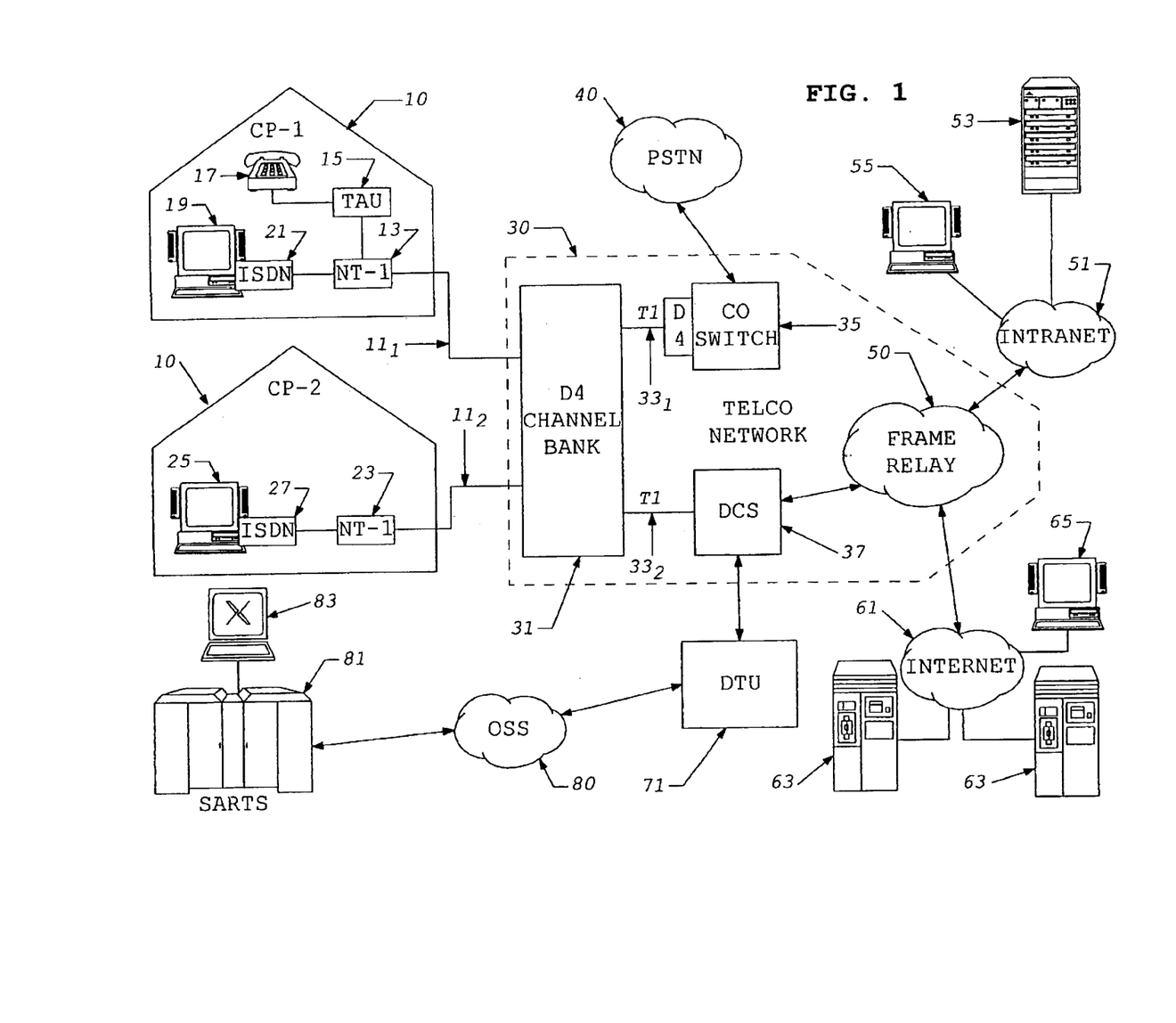
FIG. 1 is a simplified functional block diagram of the communications network, utilizing the line maintenance and testing communications techniques of the present invention.

To understand the context of the invention, it may be helpful to discuss an example of a network incorporating the invention. FIG. 1 depicts one such network in simplified form.

FIG. 1 shows two exemplary customer premises (CP) 10, which receive digital services through a telephone company (TELCO) network 30. Each customer premises receives service over a telephone line 11. Typically, at least the final drop cable to the customer premises, in each line 11, is twisted-pair copper wiring. Examples of different implementations of the telephone lines are discussed in more detail later, with regard to FIG. 2.

The TELCO network provides a number of different types of services, including plain old telephone service (POTS) and a number of digital subscriber line (DSL) services. The present invention relies on use of an embedded operations channel, for example of a type standard on ISDN services, and the adaptation thereof for certain other DSL services. To facilitate understanding of the invention, FIG. 1 depicts both ISDN and ISDL services. Thus, the subscriber at customer premises CP-1 subscribes to normal ISDN services over the line $11_1$. The subscriber at customer premises CP-2 subscribes to the IDSL service provided over the second line $11_2$.

The network portion of each subscriber's telephone line wiring ends at a network termination (NT-1), which is a standard ISDN component providing the electrical connection and interface and certain standardized intelligent functions relating to maintenance and testing. At the first customer premises CP-1, the network termination NT-1 13 provides connection between the in-house wiring and the telephone line $11_1$ to the TELCO network 30. For normal telephone service, the customer premises wiring runs from the NT-1 to a terminal adapter unit (TAU) 15, which provides an interface for a standard analog type telephone device 17. The wiring may also connect to ISDN capable telephone equipment (not shown).

For data services, a data device shown by way of example as a multimedia personal computer (PC) 19 includes an ISDN card 21. The ISDN card connects through the customer premises wiring to the NT-1 13 and though that network termination to the ISDN telephone line $11_1$.

The ISDN capable devices 15, 21 function as normal switched service communication equipment. As such, either device may access the D-channel or one or both b-channels provided by the TELCO network 30 over the telephone line $11_1$. If each uses one of the B-channels, the subscriber may have a data session going through the PC 19 and a concurrent telephone conversation through the telephone 17 and the TAU 15. For some applications, the PC 19 and the ISDN card 21 may use both B-channels, concurrently, for a higher rate data session.

The second subscriber at premises CP-2 subscribes to a digital subscriber line service, shown by way of example as an IDSL service. Like the first subscriber, the network portion of the subscriber's telephone line wiring $11_2$ ends at a network termination (NT-1) 23. Although this subscriber has an IDSL service, the termination NT-1 is a standard ISDN component providing the electrical connection and interface and certain standardized intelligent functions relating to maintenance and testing exactly the same as the NT-1 termination 13.

At the second customer premises CP-2, the network termination NT-1 23 provides connection between the in-house wiring and the telephone line $11_1$ to the TELCO network 30. In this case, however, the in-house wiring runs to one or more ISDN cards 27 associated with data services, shown by way of example as another multimedia PC 25. As discussed more later, the network 30 provides a dedicated data link service at the rate equivalent to the two B-channels over the second line $11_2$.

Typically, the terminations (NT-1) 13 and 23 are identical. The NT-1 13 at the first premises CP-1 operates in a sandwiched service mode, for normal ISDN service over the line $11_1$. The NT-1 23 at the second premises CP-2 operates in a 'leased line' or dedicated mode, to provide 2B channels in an un-switched manner, for the IDSL service over the line $11_2$.

As noted, the TELCO may provide other voice and data services. However, for the illustrated subscribers the TELCO 30 provides switched ISDN service and the IDSL dedicated data link service. For purpose of this discussion, assume that both exemplary subscribers receive service through a carrier system. At the network side, the lines $11_i$, $11_2$ both connect to a D4 channel bank 31.

A D4 channel bank 31 is a device that interfaces one or more high capacity T1 lines 33, each of which carries 24 voice rate channels in assigned 64 kb/s time slots. The channel bank 31 provides two-way time-slot interchange type switching to couple packets for the various channels on the lines 11 to and from the assigned slots on the T1 links 33. One channel unit, in the D4 bank, provides the interface for up to 24 channels on one T1 link. The channel unit interfaces to the T1 line through the common circuitry in the D4 bank, in accord with the particular service provided, in this case, ISDN or IDSL.

For normal switched ISDN services, the D4 channel bank connects through one or more T1 links $33_1$ to another D4 bank in a central office (CO) switch 35. The CO switch 35 provides selective connections through the public switched network 40, for voice and data communications.

For dedicated data services, the D4 channel bank connects through one or more T1 links $33_2$ to a digital cross-connect system (DCS) 37. The digital cross-connect system 37 in turn provides a dedicated path to a particular destination.

A DCS that provides cross-connect functionality at the DS-0 level is generically referred to as a 1/0 DCS. A 1/0 DCS device provides the necessary DS-0 grooming to provide path continuity and connection on 64×N fractional T-1 channels (FT-1). The "64" here represents the data rate of the DS-0 channel, and N indicates the number of DS-0 channels that comprise the total FT-1 payload.

A 1/0 DCS is capable of terminating a digital T1 line facility and it's embedded DS-0 multiplexed DS-1 payload signal. The 1/0 DCS is a compliment to a T1 digital channel bank, such as a D4, and provides all the necessary T1 functions relative to T1 framing format and T1 line code that comprises a digital T1 line. The 1/0 DCS will effectively function as a T1 multiplexer by breaking down the T1 payload into twenty-four discreet and individual 64 Kbs DS-0 time slots. Upon de-multiplexing the T1's DS-1 payload signal, the 1/0 DCS will provide an electrical through path for each DS-0 and connect it to another like terminated T1 line via it's time slot interchange matrix. However, unlike a T1 digital channel bank, such as a D4, the 1/0 DCS does not have the capability of converting a 64 Kbs DS-0 timeslot into an appropriately formatted signal for direct transport over analog metallic facilities to an end user. A DS-0 signal cross-connected in a 1/0 DCS must enter, and exit the DCS via T1 terminated lines.

The point to point or dedicated 2 B-channel service could run to another end user's device, for example, for a connection of a remote terminal to a port on a host computer. In the illustrated embodiment, the point-to-point link runs to a backbone date network. The D-channel is not part of the service and is not needed for call set-up. The EOC channel does not go through to the other end of the point-to-point circuit, because the device at the opposite end has no need for maintenance related communications with the device(s) at the customer premises.

In the example illustrated in FIG. 1, the DCS 37 provides a dedicated link to a higher speed backbone network, represented in this example by a Frame Relay network 50. Through these connections, the channel bank 31 and the digital cross-connect system (DCS) 37 actually provide fractional T1 service from customer premises to the frame relay backbone network 50. Fractional T1 is a service that meets a customer requirement for high date rates, which are still less than T1. The T1 or equivalent DS1 rate represents a combination of 24 of the 64 kb/s DS0 or 8 channels, at a total data rate of 1536 Mb/s. Customers are assigned predetermined portions of the T1 capacity. For example, in the New York area, fractional T1 is offered in increments of two DS0 channels beginning at 128 kb/s (2 channels) up through a maximum of twelve channels, excluding the ten channel variation. In a typical implementation of fractional T1, the carrier company connects a full T1 at the customer premises. Within that T1, a carrier assigns X number of DS0s (2, 4, 6, 8 or 12) that the customer purchases for the desired digital bandwidth.

For older installations, the carrier actually connects the T1 all the way from the customer premises to the intended destination. Such as the frame relay network 50 shown in FIG. 1. The unused DS0 slots on the T1 link are active only within the line. The network transported only the assigned DS0s.

Today, a customer such as the customer at premises CP-2 desiring two DS0s for fractional T1 access can utilize the 2 B-channels of a dedicated IDSL type subscriber line circuit. This type of data service provides two-way data communication at the combined (2) DS0 or B-channel rate of 128 kb/s over a normal twisted pair telephone line $11_2$. For many applications, this provides a substantial improvement over modem rates and single B-channel rates. The IDSL circuit extends from the channel bank 31 through the network termination (NT-1) 23 to ISDN card 27 on the customer premises. The channel bank 31 couples the 2B-channels for the IDSL circuit to 2 DS0 slots in a DS1 rate or T1 circuit $33_2$. The T1 circuit $33_2$ connects through the D4 channel bank in the digital cross-connect system (DCS) 37. The DCS typically provides a connection to a fast packet network, such as the frame relay network 50.

The frame relay network 50 in turn provides high-speed packet switched communication to private Intranets 51, and through such a network 51, to private data devices such as hosts or servers 53 and PCs or other terminals 55. The frame relay network 50 also provides high-speed packet switched communication to the public packet switched data highway, now commonly known as the Internet 61. The Internet is an interconnected series of networks, which interconnect and communicate across the network boundaries using a standard suite of protocols, referred to as Transmission Control Protocol/Internet Protocol (TCP/IP). The Internet 61 provides data communications to servers 63 and to other terminals and PCs 65, for a wide range of purposes. Data communications through the Internet include, for example, E-mail, file transfers, video conferencing, web page browsing and a whole host of other multimedia applications.

Switched ISDN, such as provided to the customer at premises CP-1, typically utilizes three DS0 time slots through the D4 channel bank 31 and the T1 link $33_1$. Two of these time slots transport the two bearer (B) channels. The other slot transports the embedded operations channel (EOC) and the data (D) channel for the one subscriber's ISDN service. Some vendors are developing systems that combine D and EOC channels for two subscribers' lines, for transport over one DS0, to recapture unused capacity.

For the ISDN service, the EOC is a communication function between the switch 35 and downstream elements of an ISDN line $11_1$ such as the NT1 13 and any other intermediate electronics which may be part of the line circuit. The switch 35, in turn, communicates with the appropriate operation support systems (not shown) for normal telephone network maintenance and testing operations.

For the IDSL service, however, the EOC channel terminates on the line card in the D4 channel bank 31. In the leased or dedicated line mode, for services such as ISDL, the D4 channel bank 31 does not couple the EOC channel to the central office switch 35. The channel bank 31 therefore includes circuitry, preferably within the individual line cards, to bridge the EOC to an in-band communication in accord with the invention.

FIG. 1 shows several other elements for maintenance and testing used in combination with the present invention. A digital test unit (DTU) 71 connects to a maintenance port of the DCS 37. For test purposes, the switch breaks an identified communication link and routes the communications through the port. Effectively, the DTU test device is connected into the digital circuit under test.

The DTU 71 and a number of other maintenance, testing and provisioning systems communicate via a private data network referred to as an "Operations and Support Systems" (OSS) network 80. For example, a mainframe computer 81 running "SARTS" software communicates with the DTU 71 via the OSS network 80. Operations personnel work at an X-terminal 83. The terminal 83 serves as the maintenance and operations console (MOC) 83, for testing of the IDSL line components. The technician works from the terminal 83, and the SARTS computer 81 communicates with the DTU 71 via the OSS network 80. The DTU 71 communicates via the invention with the actual components in the loop $11_2$. For example, these communications enable the DTU 71 to effect loop-backs through the line components in order to conduct certain tests.

In response to an addressed loop-back instruction, a particular piece of equipment in the line connects the transmit channel to the receive channel, so that signals received from the network are transmitted back to the network. A test device in the network, such as the DTU 71 sends a test pattern over the line. The equipment in the loop-back state receives the signal and sends it directly back over the line. The test equipment looks for the test pattern and analyzes the signal it receives back, to detect any errors resulting from the transport to and from the looped equipment. The DTU provides the test results through the OSS network 80 to the SARTS computer 81, which in turn provides information for display on the terminal 83.

Figure 2:
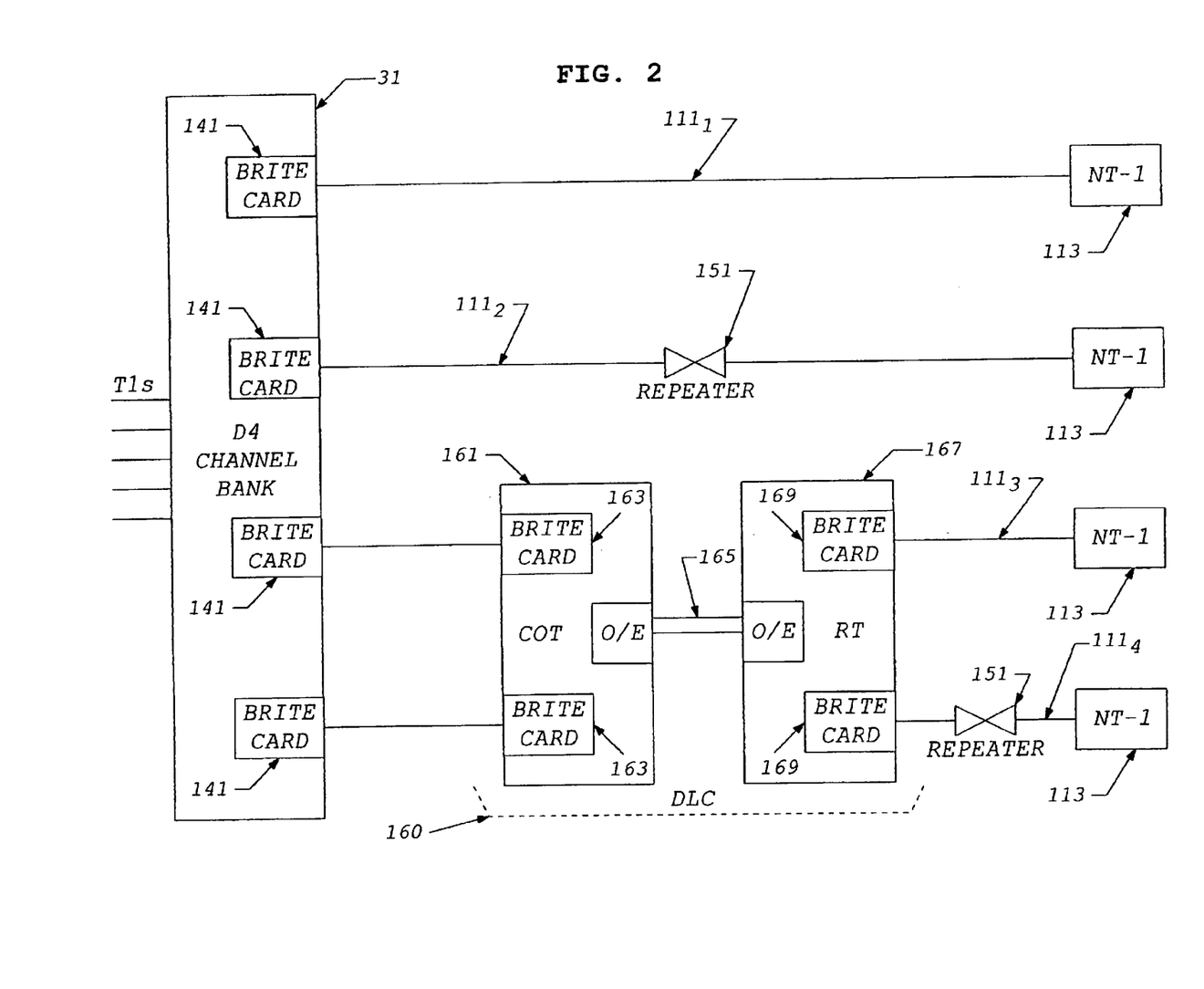
FIG. 2 is a more detailed block diagram of the line-net portion of the network of FIG. 1, and showing several implementations of the local loop plant for ISDN and IDSL type services.

To better understand the components communicating with the DTU for testing and the like, it will be helpful to consider the different types of installation for the digital subscriber lines. FIG. 2 depicts a D4 channel bank 31 and four different examples of the types of line connections 111 between the channel back and the customer premises equipment. These four line connections support ISDN and IDSL.

At the channel bank, each subscriber's line 111 terminates on a line card 141, referred to as a "2B BRITE D4 UNIT". The term "BRITE" refers to a "Basic Rate Interface Terminal Equipment" type line card 141 in the D4 channel bank 31. Some vendors use slightly different terminology, such as "U-BRITE," to refer to their version of these line cards. The BRITE card provides the electrical interface to the two-wire subscriber line 11. The BRITE card also processes the various channels on the subscriber's line, in the manner determined by its options settings. For ISDN service for example, the BRITE card couples the B-channels, the D-channels, and the EOC through the time slot interchange circuitry of the D4 channel bank 31 to the appropriate T1 33. Each B-channel occupies one DS0 time slot on the T1. For ISDN, the BRITE card and the common circuitry of the channel unit couple the D channel and the EOC together to another 64 kb/s DS0 time slot on the T1 link, to carry those channels to the serving central office switch 35.

Each "BRITE" card 141 actually provides ISDN terminations for a number of subscriber lines. For each subscriber line terminated on the BRITE card 141, the card provides the ISDN standard electrical and protocol interface to the wiring of the line. For a normal ISDN line, the customer premises end of the line terminates in a network termination unit commonly referred to as an "NT-1" 113. Customer premises wiring extends from the NT-1 to RJ-11 jacks on the premises, where the customer can connect terminal adapter units or ISDN compatible equipment, as shown for example in FIG. 1.

The ISDL line also runs from a BRITE line card 141 and terminates at the customer premises in a standard NT-1 unit 113, for connection of customer premises wiring from the subscriber's data equipment. For the IDSL service, the BRITE card 141 is set to a 'leased line' mode for 128 kb/s service. The NT-1 also operates in a 'leased line' mode, for communication over the two B-channels at the combined rate (128 kb/s). The ISDN and IDSL services use similar protocols on the line, but the IDSL service is a dedicated data link service, whereas the normal ISDN service is a switched service.

There are essentially four types of subscriber line implementations that are common for both ISDN and ISDL, as shown in this drawing. For twisted pair lines up to approximately 18,000 feet in length, a copper wire pair 111 connects the customer's NT-1 interface 113 directly to the assigned terminal on the BRITE card 141 serving that subscriber. Such an installation provides metallic wire facilities all the way from the location of the D4 channel bank 31 to the particular customer premises.

Where the subscriber's distance from the central office is greater than 18,000 feet, there are a number of implementations used to extend the service to the subscriber's location. The first shown in FIG. 2 involves the use of one or more repeaters 151. A repeater 151 receives signals on the line $111_2$ and regenerates the signals for transmission to the next component on the line. A number of vendors today make mid-span repeaters specifically designed for ISDN subscriber lines. Since the IDSL service uses the coding and protocols of standard ISDN, the ISDN repeaters serve equally well on the ISDL subscribers' lines. Typical ISDN circuits today can have anywhere from one to four such repeaters 151 in the line between the central office and the customer premises. FIG. 2 shows one such repeater in the second subscriber's line $111_2$, but like the ISDN service, the IDSL subscriber's line may have up to four mid-span repeaters.

For longer distances or for lines into communities of a large number of subscribers, carriers use digital loop carrier (DLC) systems. As shown in FIG. 2, a DLC system 160 includes a central office terminal (COT) 16 and a remote terminal (RT) 167. As the name implies, the COT typically is collocated with the switching equipment at the serving central office. Each subscriber's line circuit, e.g. for ISDN or ISDL, connects from the BRITE card 141 in the D4 channel bank 31 to a matching card 163 in the COT 161. Information is transferred between the channel bank 31 and the COT 161 according to Bellcore TR-008, TR-57, and TR-303 interface standards. In particular, these standards support the full 2B+D+EOC of standard BRI type ISDN, and the IDSL service uses the same protocol up to the channel back.

Depending on the implementation, the COT and RT may connect to each other via electrical circuits such as T1s or one or more DS3s. Most modern DLC system, however, utilized optical transport over one or more interconnecting fibers 165. In such a system, information is carried between the COT 161 and the RT 167 as 64 kb/s encoded digital channels multiplexed on an optical transport stream, for example on an OC-3 SONET transport stream. Each terminal includes optical/electrical interfaces for converting between the OC-3 signal on the optical fiber 165 and an electrical signal, and multiplexer/demultiplexer circuitry for combining traffic for fiber transport and demultiplexing downstream traffic for the 64 kb/s digital channels, which are directed to appropriate BRITE line cards 161 or 169.

In the DLC system, the terminals (COT and RT) pass the D-channel and the EOC-channel for each SDN or IDSL circuit unchanged. Depending on the precise terminal vendor's implementation, the terminals may assign one DS0 on the transport between the terminals for the D-channel and the EOC channel of each line, or the terminals may combine the D-channel and the EOC channel of two lines into one DS0.

The remote terminal (RT) 167 of the DLS system provides essentially the same interface to the wire line to the customer premises as provided by the D4 channel bank for those lines that do not need DLC extension. At the remote terminal, each subscriber's line $111_3$, $111_4$ terminates on another BRITE line card 169. For each ISDN or IDSL subscriber line terminated on the BRITE card 169 in the DLC remote terminal 167, the card provides the ISDN standard electrical and protocol interface to the wiring of the line 111. Each ISDN or IDSL line $111_3$, $111_4$ from the remote terminal (RT) 167 terminates at the customer premises in a standard NT-1 unit 113, for connection of customer premises wiring from the subscriber's equipment. To customer premises equipment, such lines function exactly as do the lines $111_1$, $111_2$ connected directly to the D4 channel bank.

For twisted pair lines up to approximately 18,000 feet in length from the remote terminal 167 to the termination 113 at the customer premises, the copper wire pair connects the customer's NT-1 interface 113 directly to the assigned terminal on the BRITE card 169 within the remote terminal 167. In this type of installation, metallic wire facilities extend from the remote terminal location to the customer premises. Where the subscriber's distance from the remote terminal is greater than 18,000 feet, there may be one to four mid-span repeaters 151 in the line $111_4$, to further extend the service to the subscriber's location in the same manner as for the repeater connection to the channel bank in line $111_2$.

In each of these four installations, the BRITE line card 141 of the channel bank 31 provides a standard 2B1Q coded ISDN Digital Subscriber Loop (IDSL) U-interface facing the NT-1 113 at the customer premises over the line 111. The U-interface supports the full 2B+D+EOC ISDN communications on the line 111. The three elements, B-channels, D-channel and EOC-channel, form a 160 kb/s transport signal scheme conforming to the basic rate interface (BRI) of ISDN. However, for the IDSL service, the BRITE card is set to a 'leased line' mode for 128 kb/s service. In this mode, the BRITE line card 141 couples only the two B-channels through the elements of the D4 channel bank 31 to the T1 line. The D4 channel bank 31 couples the B-channels of a particular subscriber line to two assigned DS0 slots on the T1 link.

The equipment on the digital subscriber line (ISDN or IDSL) may utilize actual components from many different equipment vendors. The customers can pick ISDN terminal adapter units from any number of vendors. Within the network, the carrier operation company selects the equipment, but many such companies now purchase from a number of different companies, to obtain lower prices through competition. In a large service area, the carrier may use digital loop carrier (DLC) equipment, mid-span repeaters and NT-1 terminations for ISDN or IDSL lines from several different vendors.

A carrier operating a network of the type shown in FIGS. 1 and 2 must be able to conduct tests on various parts of the subscriber's lines. To conduct tests, such as loop-back tests, the carrier must be able to communicate command and control information with the various elements along the subscribers' lines. The carrier also may need to communicate with the line elements to obtain status information and the like. In the specific example of FIGS. 1 and 2, the carrier needs maintenance and test communications with the NT-1 interfaces at the customer premises. The carrier also needs maintenance and test communications with any repeaters in the lines, and the carrier needs maintenance and test communications with COT and RT. For normal ISDN services, the carrier can communicate through the central office switch 35 and use the EOC channel on the line to communicate with each of these components on the line.

The ISDN EOC provides several functions. The EOC provides synchronization of the two-wire line. The EOC provides in-service performance monitoring of the two network equipment on the line. The EOC also provides the capability to loop-back all active line elements, up to the NT1 termination at the customer premises.

ISDN equipment all conforms to an established standard, for a wide range of physical and functional characteristics. Of note for purposes of the present invention, all such line equipment sends and receives a standard set of EOC messages, including EOC messages relating to testing and maintenance. The most significant of these standard messages relate to loop-back testing.

The IDSL service, however, does not provide transport for the EOC channel through the switch fabric. For dedicated or leased line type services, such as IDSL, the channel bank 31 only couples the B-channels to the higher-level network elements. To facilitate testing, the invention therefore provides in-band signaling for maintenance and testing.

As shown in FIG. 1, the carrier provides a digital test unit (DTU) 71 coupled to the DSC 37. Such test units are known for testing of circuits of the DCS. The DTU 70 is just one of many maintenance, testing and provisioning systems that the carrier operates. These systems communicate via a private data network referred to as an "Operations and Support Systems" (OSS) network 80. One of the maintenance control related systems is a mainframe computer 81 running "SARTS" software. Operations personnel initiate test procedures and obtain results through operation of a maintenance and operations console (MOC), shown as a x-terminal 83, associated with the SARTS computer 81.

Of particular note for purposes here, the operator or technician at the MOC can initiate a test of an IDSL line using the terminal 83. In response, the SARTS computer 81 sends appropriate instructions to the DTU 71 serving as the test point for the particular segment of the TELCO network 30. In response, the DTU 71 initiates a test procedure with respect to an identified line 11 (FIG. 1). Assume here that the test is for an IDSL line, such as the line $11_2$.

For such a test, the SARTS system 81 instructs the DTU 71 to initiate in-band signaling through the test access port of the DSC 37 to the B-channels going to and from the line $11_2$ under test. The in-band signaling terminates in the BRITE line card 163 (FIG. 2) within the D4 channel bank 31. In accord with the invention, the line card 163 converts to the appropriately addressed protocol for EOC communication and places the maintenance and testing commands within the EOC, for transmission to the appropriate component along a particular subscriber's line $11_2$.

The translation from in-band DDS codes to EOC codes allows use of the EOC capabilities with the IDSL type dedicated line connection. On the IDSL line, the EOC provides synchronization of the two-wire line, in-service performance monitoring of the network equipment on the line, and the capability to loop-back all active line elements, essentially the same as on a line used for the switched ISDN service.

To the equipment in the IDSL line, the D4 channel bank 31 now looks like a normal central office switch with ISDN capabilities, such as the 5ESS (Lucent) or DMS-100 (NORTEL). Standard ISDN components used in the IDSL loop plant facilities can communicate for test and maintenance purposes using the standard EOC signaling protocol, regardless of the vendor of the channel bank, the line card, or the specific component under test within the line circuit. To the test point 71, the network elements on the ISDL line $11_2$ behind the D4 channel bank look like DDS components.

In practice, a digital test point in the operations and support system generates in-band codes in the protocol used for DDS. The network carries the codes in the subscriber's data stream to the BRITE card 163. At the network edge, represented by the D4 channel bank 31, the line card is the last network piece of equipment before the subscriber loop. This card recognizes the in-band DDS codes, captures the codes from the data stream and decode those codes. The card translates each code to an appropriate ISDN EOC loop code.

For a loop-back command, for example, the line card would recognize and capture a DS0DP loop code. The line card 163 translates the DS0DP code. Specifically, the line card analyzes the manner in which the loop code was executed, to determine which given element downstream from the test point is selected for this test, and translates the code to an EOC code for that element. For example, if the code is a DS0DP number three loop-back, the intent is that the third element from the test point 71 should react to that loop-back code. The line card generates an EOC loop-back command addressed to that element.

The DDS to EOC test translation uses a series of conventions. The DDS DS0-DP test loop code is employed to establish and release all down stream non-CPE IDSL elements from a network digital test access point. The DDS CSC test loop code is employed to establish and release a 2B+D loop-back at the NT1. The in-band DDS DS0-DP loop code is detected and translated by the 2B optioned channel unit into appropriate layer two ISDN EOC messages. Translated DDS to ISDN EOC layer two messages follow standard ISDN EOC address messages, and can be applied in the manners shown in Table 1.

TABLE 1

| DDS INBAND LOOP COMMAND | ISDN EOC ADDRESS NUMBER | ISDN EOC ELEMENT NUMBER | ISDN PAYLOAD LOOPBACK | LOOPBACK ESTABLISHED AT |
| --- | --- | --- | --- | --- |
| DS0-DP #1 | N/A | N/A | 2B Only | NTWK D4 UNIT |
| DS0-DP #2 | 1 | ISDN #1 | 2B + D | DLC or RPTR |
| DS0-DP #3 | 2 | ISDN #2 | 2B + D | DLC or RPTR |
| DS0-DP #4 | 3 | ISDN #3 | 2B + D | DLC or RPTR |
| DS0-DP #5 | 4 | ISDN #4 | 2B + D | DLC or RPTR |
| DS0-DP #6 | 5 | ISDN #5 | 2B + D | DLC or RPTR |
| DS0-DP #7 | 6 | ISDN #6 | 2B + D | DLC or RPTR |
| DDS CSU | 0 | NT1 | 2B + D | CPE NT1 |
| DDS DSU | N/A | N/A | 2B Only | CPE* |

*Assumes CPE is capable of detecting an in-band DDS 56/64 K DSU latching loop-back command on B1 or on both individual B1 & B2 payload channels.

When testing from a network test access point, the first DDS DS0-DP loop message operates a 2B 128 KBs loopback in the associated network channel bank unit, AKA: D4 BRITE card 141. All subsequent DS0-DP loop requests beyond the network 2B optioned D4 BRITE card are translated by the D4 BRITE card into appropriate downstream EOC addressed 2B+D element loop-backs.

The ISDN numbers in the third column of the table address elements in serial order downstream from the line card 141, with the last element; the NT-1 identified by a 0. In the line $111_4$, for example, the COT 161 would be element #1, the RT 167 would be element #2, the repeater 151 would be #3, and the terminal 113 would be #0. The BRITE line card 141 serving the particular line includes a table to translate the DDS addresses to the corresponding ISDN EOC addresses. The downstream ISDN components on the IDSL line recognize EOC messages addressed to them in this manner.

Similar procedures and translations are used in the line card to convert upstream EOC messages to DDS messages for in-band transmission to the DTU or other test device.

Figure 3:
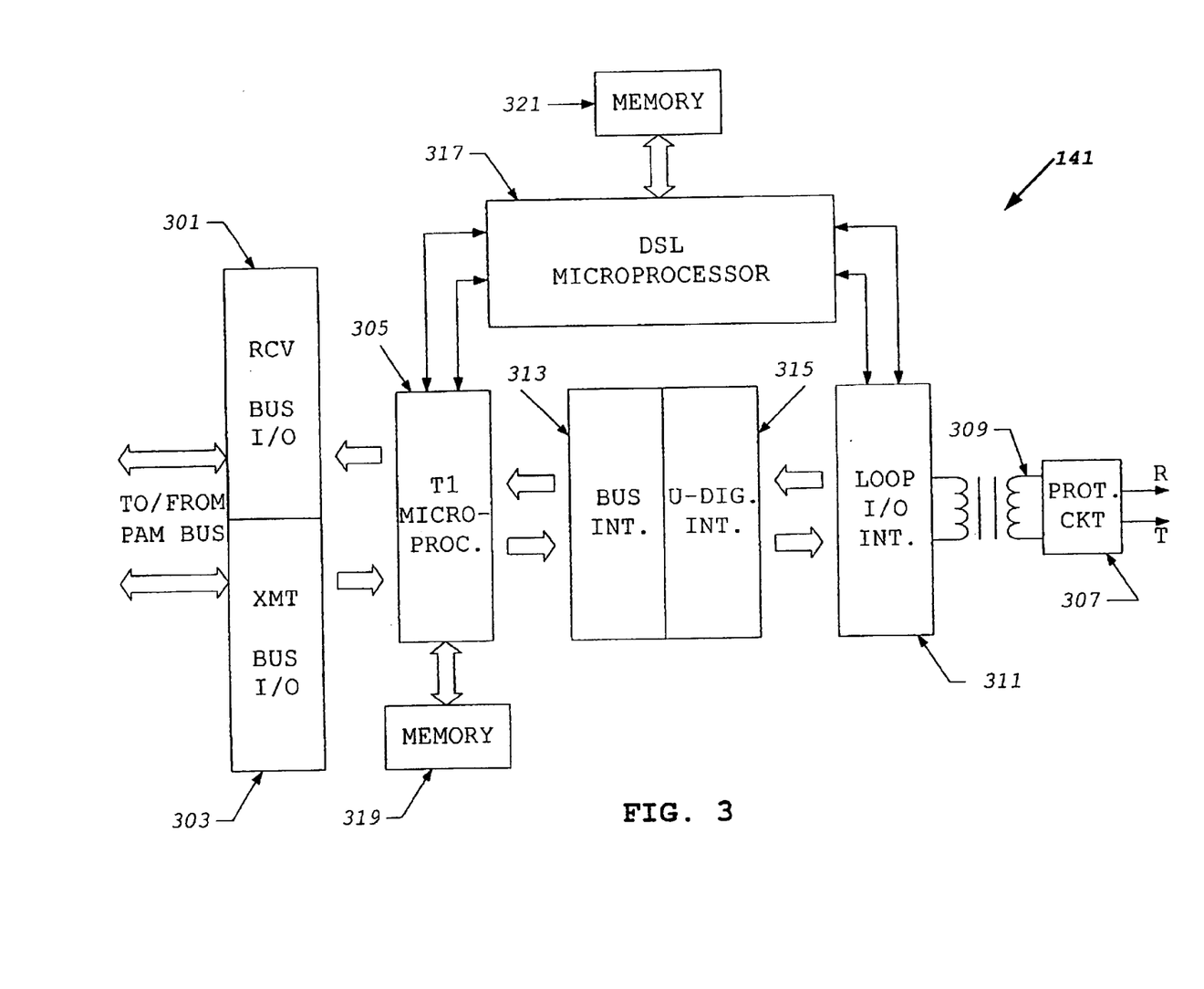
FIG. 3 is a simplified block diagram of an exemplary line card which may be used to implement the invention.

FIG. 3 depicts the most relevant portions of an example of a line card 141 of the type used in the present invention, in simplified block diagram form. The portions of the line card 141 illustrated in FIG. 3 include a receive bus input/output (I/O) interface 301 and a transmit bus I/O interface 303. These I/O devices provide two-way data transfers to and from the pulse amplitude modulation (PAM) bus, which serves as the time-slot interchange mechanism within the D4 channel bank 31 for multiplexing/demultiplexing channels for a number of such cards to and from the 24-channel T1s. The bus I/O interfaces 301, 303 in turn connect to a T1 microprocessor 305, which processes the signals as appropriate for transmission and reception via the channels on the T1s.

The tip (T) and ring (T) leads of the customer's line connect through protection circuitry 307 and a transformer 309 to a loop-side I/O interface 311. A bus interface 313 and a U-digital interface 315 interconnect the T1 microprocessor 305 and the loop I/O interface 311. Through the transformer and the protection circuit, the loop I/O interface 311 provides the standard digital and electrical characteristics for the ISDN or IDSL appearance of the card facing toward the customer premises over the subscriber's line. The line card 141 also includes a digital subscriber line (DSL) microprocessor 317. The DSL microprocessor 317 controls overall operation of the line card 141, particularly the operations of the T1 microprocessor 305 and the loop I/O interface 311.

One commercial example of a line card that may be programmed to function as the line card 141 is the Teltrend D4/SLC-96 ISDN Basic Rate Interface Channel Unit Model BRI4801I2 or Model BRI4801RP2.

The microprocessors 305 and 317 both are programmable devices, and for programming purposes, both devices include or are associated with program memories 319, 321. The memories are shown separately for purposes of discussion. The T1 microprocessor performs the actual recognition of command codes and two-way conversions between the DDS and EOC protocols.

Thus, for downstream processing, the memory 319 for the microprocessor 305 stores appropriate program code and associated control data, to enable the microprocessor 305 to recognize DDS codes within the downstream channel data received from the PAM bus through I/O interface 301. This programming also enables the T1 microprocessor 305 to convert such commands to EOC commands, in response to instructions from the DSL microprocessor 319.

For upstream processing, the memory 319 for the microprocessor 305 stores appropriate program code and associated control data, to enable the microprocessor 305 to recognize EOC codes, received in the upstream portion of the EOC channel on the IDSL loop. The programming also enables the T1 microprocessor 305 to convert such commands to DDS commands for upstream in-band transmission through I/O interface 303, in response to instructions from the DSL microprocessor 319.

The memory 321 for the microprocessor 317 stores appropriate program code and associated control data, to enable the microprocessor 317 to react to DDS or EOC codes detected by the microprocessor 305 and instruct the microprocessor 305 to generate corresponding messages in the other protocol.

In operation, the T1 microprocessor 305 looks for the addressed DDS maintenance command codes in-band, i.e. within the data stream for the two B-channels. When the T1 microprocessor 305 detects any one of those codes, it provides an indication thereof to the DLS microprocessor 317. The DSL microprocessor 317 instructs the T1 microprocessor 305 to generate and send the corresponding EOC command through the other elements of the card 141 to the subscriber's line $11_2$. Similarly, the T1 microprocessor 305 detects upstream EOC messages and provides notification thereof to the DSL microprocessor 317. The DSL microprocessor in turn instructs the T1 microprocessor 305 to generate and send corresponding DOS messages upstream.

In the embodiment illustrated in the three drawing figures, the carrier provides an IDSL type line between a D4 channel bank and the customer's premises. For data communications, the line carriers fractional T1 bandwidth corresponding to two DS0 channels (matching the two B-channel capacity of the line). For data service, the fractional T1 link couples the B-channels to a high-speed packet network, such as frame relay, SMDS or ATM, to enable access to the Internet or private data networks. The line circuit also transports the D-channel and the embedded operations channel (EOC), in normal ISDN fashion, but only between the channel bank and the network termination unit (NT-1) in the customer premises. For maintenance and testing purposes, the carrier operations facilitates communication loop-back commands and other messages, as in-band signaling messages, for example using a DDS protocol. These signaling messages go as in-band data together with other data for the subscriber, to and from the line card within the channel bank there is serving the particular IDSL circuit. For example, a command may be addressed to any active node along the subscriber's IDSL circuit, albeit in the in-band protocol (e.g. DDS). The line card serving the subscriber's circuit detects the addressed commands, removes the commands from the in-band data and reformats the commands for transmission over the EOC channel. The line card addresses the commands using the normal protocol for EOC communications and sends the EOC format commands over the ISDL circuit to the appropriate component along the subscriber's line. Assuming that the command is a loop-back command, for example, the addressed component connects the circuit in a loop-back mode, to enable test signal transmission and analysis. The component sends messages back, for example to acknowledge commands, in essential a reverse of the above procedure. The component sends an EOC message out-of-band, and then the line card converts the message to an in-band DDS message.

Consider a brief example of an actual operation. A customer at CP-2 subscribes to the IDSL service, but the customer experience problems. The customer calls up 611 or some other network service number and reports that she is running errors on her line $11_2$. The carrier processes the trouble report and gives a trouble ticker to a technician. The technician activates the DTU to connect it onto the customer's circuit and initiate loop-back testing. Specifically, from the terminal 83, the technician identifies the line to be tested. The SARTS computer 81 provides instructions to the DTU 71 and to the DCS switch 37, to connect the circuit for the line $11_2$ through the maintenance port to the DTU 71.

The first thing the technician actually tests for is the operation of the device at the farthest end of the circuit, which in this case would be the NT-1 23. For this purpose, the technician operates the terminal 83 to identify the desired test point, in this case the NT-1 23. The SARTS computer 81 provides instructions through the OSS network 80 to the DTU 71, and the DTU formulates a channel server unit (CSU) loop-back command addressed to the NT-1 in the DDS protocol. The DTU sends the command as in-band data through the DCS and the D4 channel bank 31. The BRITE line card 141 connected to the line $11_2$ recognizes the loop-back command in the data stream. As discussed above, the elements within the card 141 pick the command out of the data stream and convert the command to the EOC command format. As part of the conversion, the address format is converted from that of the DDS protocol to that used on the EOC channel, so that in the EOC format, the message is addressed to the NT-1 (see Table 1). The BRITE line card 141 transmits the converted message over the EOC channel on the subscriber's line $11_2$.

The NT-1 23 detects EOC messages in the normal manner, the same as for ISDN service. In the present example, the NT-1 detects the addressed loop-back command. In response, the NT-1 connects the receive channel on the line to the transmit channel on the line. The NT-1 provides this loop-back connection for both B-channels and the D-channel, although for the IDSL service the D-channels is not in use.

The NT-1 also sends back an acknowledge signal. The NT-1 sends the as an EOC message. The BRITE card 141 receives the EOC acknowledgement and converts that message to a DDS protocol message. The BRITE card 141 inserts the DDS protocol acknowledgement message in the transmit data stream coming from the line $11_2$. As a result, the message travels with any other upstream data on the circuit through the common elements of the D4 channel bank 31, the T1 $33_2$ and the DCS switch 37 to the DTU 71. The DTU receives and processes the acknowledgement message as a normal DDS response message.

The DTU 71 can now send, receive and analyze test signals. Specifically, the DTU 71 sends a test pattern through the maintenance port of the DCS switch 37. Since the switch is connecting the port to the subscriber's dedicated digital circuit, the test pattern goes through the D4 channel bank 31 to the subscriber's line $11_2$. Signals received at the NT-1, in its present loop-back condition, go back over the line, through the D4 channel bank and the DCS switch to the DTU test device. The DTU 71 analyzes the looped back test pattern signals to determine whether or not the signals are running through the line and the NT1 error free and reports the results through the OSS network 80 and the SARTS computer 81 to the technician on terminal 83.

If the test results show error free communication, for example, then the customer's equipment or wiring is causing the problems. The technician then initiates a procedure to terminate the test. The terminal 83 identifies the decision to terminate the test to the SARTS computer 81, which provides an appropriate instruction to the DTU 71 via the OSS network 80. The DTU 71 formulates a channel server unit (CSU) loop-down command addressed to the NT-1 23 in the DDS protocol. The DTU sends the loop-down command as in-band data through the DCS 37 and the D4 channel bank 31. The BRITE line card 141 connected to the line $11_2$ recognizes the loop-down command in the data stream, picks the command out of the data stream, and converts the command to EOC command format. The EOC message is addressed to the NT-1. The line card 141 transmits the converted message over the EOC channel on the subscriber's line $11_2$. The NT-1 23 detects the EOC loop-down message and disconnects the receive channel from the transmit channel on the line. At the customer premises, the line is now restored to normal operation. The NT-1 also sends an acknowledgement message through the EOC, and the BRITE line card 141 converts that message to DDS format for relay to the DTU 71. The DCS 37 also receives an instruction to disconnect the line $11_2$ from the maintenance port and restore normal connections through the network for the subscriber's dedicated service.

The test operation through the NT-1 may fail, e.g. because of an open circuit in the line, a failure of a line component, or such extreme corruption of the communications over the line as to prevent accurate transmission or reception over the EOC channel. In such a case, the DTU 71 will not receive an acknowledgement of the loop-back command within a predetermined period. Alternatively, one or more elements on the line, such as the BRITE card 141, may provide a fault code in response to the loop-back command. If the test through the NT-1 shows that there are errors found in the loop-back through the NT-1 or the test operation fails, the technician repeats the test for the next element up the line, such as the repeater 151 or the RT 167 (see FIG. 2).

Through successive loop-back testing, the technician often can determine the section of the line that is producing the errors. The technician at an operations center can then contact outside plant workforce, to dispatch a field technician to make repairs.

Persons skilled in the art will appreciate that the invention admits of a variety of applications and modifications, which fall within the spirit and scope of the concepts of the invention. For example, the preferred embodiments discussed above applied the inventive maintenance and testing related communications to IDSL type subscriber line circuits. Clearly, the concepts of the invention apply equally well to other types of digital subscriber line circuits utilizing EOC channels, such as high bit-rate digital subscriber line (HDSL) circuits. As another example, the illustrated embodiments utilized the line card in the channel back to provide the conversions between in-band and EOC messages.

Also, other elements on the edge of the network, such as remote terminals of DLC systems, that are directly integrated to an interoffice 1/0 DCS or T1 transport network, may be adapted to perform these maintenance-related conversions. Network integrated DLC Remote Terminals provide an operating telephone company with alternatives at providing dedicated private line network service channel terminations without the need to provide costly, and cumbersome back to back channel bank arrangements that mandate multiple analog to digital and digital to analog DS-0 signal conversions. In traditional standalone DLC system installations, a DLC will consist of a Central Office Terminal (COT) channel back, and a Remote Terminal (RT) channel bank. The RT bank is generally located at or near subscriber locations. Both COT and RT banks are connected via appropriate digital facilities in the local loop. Each DLC channel bank functions effectively as a standard T1 digital multiplexer by multiplexing and de-multiplexing all transported analog DS-0 based channels. A dedicated non-locally switched private line channel, for example, transported over DLC facilities will utilize a DS-0 channel assignment on the DLC system, and will inter-connect the private line channel to a D4 channel bank that represents the network inter-office edge. All inter-connection between a DLC COT and D4 is then made at each circuit's individual and appropriate analog metallic state. In accord with the invention, the line card serving the subscriber in the RT detects the in-band commands, removes the commands from the in-band data and reformats the commands for transmission over the EOC channel.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of communicating testing or maintenance related messages through a network to a component of a digital subscriber line, comprising:

sending a message addressed for the component in-band through at least one optioned communication channel unit of the network assigned to the digital subscriber line, the digital subscriber line providing ISDN and IDSL services;

disabling a data (D) channel associated with IDSL services;

detecting the in-band message in the at least one optioned communication channel unit assigned to the digital subscriber line at an edge of the network;

converting the detected in-band message to an addressed out-of-band message; and sending the converted message over an embedded operations channel on the digital subscriber line from the edge of the network toward the component.

2. A method as in claim 1, further comprising:

receiving the converted message at the component; and in response, performing a testing or maintenance related operation.

3. A method as in claim 2, wherein the testing or maintenance related operation comprises establishing or tearing down a loop-back condition of the at least one optioned communication channel unit on the digital subscriber line through the component.

4. A method as in claim 2, further comprising:

sending an out-of-band response message over the embedded operations channel on the digital subscriber line from the component to the edge of the network;

detecting the response message at the edge of the network;

converting the detected response message to an in-band message; and sending the converted response message over the at least one optioned communication channel unit assigned to the digital subscriber line.

5. A method as in claim 1, wherein the message addressed for the component uses a Digital Data Service (DDS) protocol and an embedded operations channel (EOC) protocol for Integrating Services Digital Network (ISDN).

6. A method as in claim 1, wherein the edge of the network comprises a line card coupled to the digital subscriber line.

7. A method as in claim 6, wherein the line card is a line card of a channel bank of a carrier system.

8. A method as in claim 6, wherein the line card is a basic rate interference terminal equipment (BRITE) card.

9. A method as in claim 1, wherein the digital subscriber line comprises an ISDN digital subscriber line.

10. A method as in claim 1, wherein the components is an ISDN compatible element selected from the group consisting of: a mid-span repeater, a central office terminal of a digital loop carrier system, a remote terminal of a digital loop carrier system, and a network termination at a customer premises.

11. A method as in claim 1, wherein the at least one optioned communication channel unit includes at least one pair of bearer channels (B-channels) that permits in-band test access at a payload data rate.

12. A method as in claim 11, wherein the at least one pair of B-channels is included in a circuit that comprises a maximum of 12 pairs of B-channels broken down into 24 discrete time slots such that each B-channel is associated with one time slot.

13. A method as in claim 12, wherein the payload data rate ranges from 64 kilobits per second to 1536 megabits per second.

14. A method of communicating testing or maintenance related messages through a network from a component of a digital subscriber line, comprising:

sending an out-of-band message over an embedded operation channel on the digital subscriber line, the digital subscriber line providing ISDN and ISDL services from the component to an edge of the network;

detecting the out-of-band message at the edge of the network;

disabling a data (D) channel associated with IDSL services;

converting the detected out of band message to an in-band message; and sending the converted message together in-band through the network with upstream data from at least one optioned communication channel unit assigned to the digital subscriber line to a testing or maintenance device.

15. A method as in claim 14, wherein the out-of-band message uses an embedded operations channel (EOC) protocol for Integrated Services Digital Network (ISDN) and a Digital Data Service (DDS) protocol.

16. A method as in claim 14, wherein the edge of the network comprises a line card coupled to the digital subscriber line.

17. A method as in claim 16, wherein the line card is a line card of a channel bank of a carrier system.

18. A method as in claim 16, wherein the line card is a basic rate interference terminal equipment (BRITE) card.

19. A method as in claim 14, wherein the digital subscriber line comprises an ISDN digital subscriber line.

20. A method as in claim 14, wherein the component is an ISDN compatible element selected from the group consisting of: a mid-span repeater, a central office terminal of digital loop carrier system, a remote terminal of a digital loop carrier system, and a network termination at a customer premises.

21. A method as in claim 14, wherein the at least one optioned communication channel unit includes at least one pair of bearer channels (B-channels) that permits in-band test access at a payload data rate.

22. A method as in claim 14, wherein the at least one pair of B-channels is included in a circuit that comprises a maximum of 12 pairs of B-channels broken down into 24 discrete time slots such that each B-channel is associated with one time slot.

23. A method as in claim 22, wherein the payload data rate ranges from 64 kilobits per second to 1536 megabits per second.

24. A line card for connection at an edge of a communication network to a digital subscriber line, the line card comprising:

a network interface for two-way digital communication of information for the digital subscriber line, the digital subscriber line providing ISDN and IDSL services through at least one optioned communication channel unit of the network assigned to the digital subscriber line;

a line interface in communication with the network interface for connection to the digital subscriber line and for two-way digital communication of information between the assigned at least one optioned communication channel unit, the line interface also providing two-way digital communications over an embedded operations channel on the digital subscriber line, the embedded operations channel being logically separate from the at least one optioned communication channel unit on the line; and a processor, coupled to the interfaces, for converting maintenance or testing messages between an in-band protocol used on the assigned at least one optioned channel unit and a protocol used on the embedded operations channel, wherein the processor converts between Digital Data Service (DDS) protocol and embedded operations channel (EOC) protocol for Integrated Services Digital Network (ISDN).

25. A line card as in claim 24, wherein the line interface is capable of providing an ISDN digital subscriber line service over the line.

26. A line card as in claim 24, wherein the network interface is compatible with multiplexing circuitry of a channel bank at the edge of the network.

27. A line card as in claim 24, wherein the at least one optioned communication channel includes at least one pair of bearer channels (B-channels) that permits in-band test access at a payload data rate.

28. A line card as in claim 27, wherein the at least one pair of b-channels is included in a circuit that comprises a maximum of 12 pairs of B-channels broken down into 24 discrete time slots such that each B-channel is associated with one time slot.

29. A line card as in claim 28, wherein the payload data rate ranges from 64 kilobits per second to 1536 megabits per second.

30. A communication network, comprising:
  (a) a transport fabric for carrying digital communication channels assigned to subscriber lines;
  (b) a test device for conducting tests relating to the subscriber lines and for communicating test related messages through the digital communication channels;
  a digital subscriber line providing ISDN and IDSL services running from a customer premises to an edge of the transport fabric of the network and carrying at least one optioned communication channel unit and a logically separate embedded operations channel;
  a communication component connected along the digital subscriber line for providing throughput of the at least one optioned communication channel unit on the digital subscriber line, a line component communicating test messages via the embedded operations channel on the line; and
  a line card for connection to the digital subscriber line at the edge of transport fabric of the network for throughput between the at least one optioned communication channel unit assigned to the digital subscriber line in the transport fabric, said line card communicating test related messages with the test device via the assigned at least one optioned communication channel unit and communicating the test messages with the communication component via the embedded operations channel on the digital subscriber line.

31. A communication network as in claim 30, wherein the line card and the communication component support the ISDN and IDSL services over the digital subscriber line.

32. A communication network as in claim 30, wherein the communication component is a device selected from the group consisting of a mid-span repeater, a central office terminal of a digital loop carrier system, a remote terminal of a digital loop carrier system, and a network termination at the customer premises.

33. A communication network as in claim 30, wherein the at least one optioned communication channel unit includes at least one pair of bearer channels (B-channels) that permits in-band test access at a payload data rate.

34. A communication network as in claim 33, wherein the at least one pair of B-channels is included in a circuit that comprises a maximum of 12 pairs of B-channels broken down into 24 discrete time slots such that each B-channel is associated with one time slot.

35. A communication network as in claim 34, wherein the payload data rate ranges from 64 kilobits per second to 1536 megabits per second.

36. A method for communicating testing or maintenance related messages through a network to a component of a digital subscriber line, comprising:
  sending a message addressed for the component in-band through at least one optioned communication channel unit of the network assigned to the digital subscriber line, the digital subscriber line providing ISDN and IDSL services;
  detecting the in-band message in the at least one optioned communication channel unit assigned to the digital subscriber line at an edge of the network;
  converting the detected in-band message to an addressed out-of-band message; and
  sending the converted message over an embedded operations channel on the digital subscriber line from the edge of the network toward the component without utilizing a data (D) channel associated with said IDSL service.

37. A method of communicating testing or maintenance related messages through a network from a component of a digital subscriber line, comprising:
  sending an out-of-band message over an embedded operations channel on the digital subscriber line, the digital subscriber line providing ISDN and IDSL services from the component to an edge of the network;
  detecting the out-of-band message at the edge of the network;
  disabling a data (D) channel associated with IDSL services;
  converting the detected out of band message to an in-band message; and
  sending the converted message together in-band through the network with upstream data from at least one optioned communication channel unit assigned to the digital subscriber line to a testing or maintenance device without utilizing a data (D) channel of said ISDL service.

* * * * *